United States Patent
Noguchi et al.

(10) Patent No.: US 9,263,079 B2
(45) Date of Patent: Feb. 16, 2016

(54) METHOD FOR PRODUCING AND DEVICE FOR PRODUCING MAGNETIC RECORDING MEDIUM

(75) Inventors: Tomoyuki Noguchi, Kawasaki (JP); Katsuo Hara, Ichihara (JP); Masato Saito, Ichihara (JP); Yushi Kinoshita, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 507 days.

(21) Appl. No.: 13/574,976

(22) PCT Filed: Jan. 24, 2011

(86) PCT No.: PCT/JP2011/051182
§ 371 (c)(1),
(2), (4) Date: Jul. 24, 2012

(87) PCT Pub. No.: WO2011/093232
PCT Pub. Date: Aug. 4, 2011

(65) Prior Publication Data
US 2012/0295018 A1 Nov. 22, 2012

(30) Foreign Application Priority Data

Jan. 26, 2010 (JP) .................................. 2010-014272

(51) Int. Cl.
*G11B 5/84* (2006.01)
*B05D 1/18* (2006.01)
(Continued)

(52) U.S. Cl.
CPC .................. *G11B 5/8408* (2013.01); *B05C 3/02* (2013.01); *B05C 13/02* (2013.01); *B05D 1/18* (2013.01); *G11B 5/84* (2013.01)

(58) Field of Classification Search
CPC ..................................................... G11B 5/8408
See application file for complete search history.

(56) References Cited

U.S. PATENT DOCUMENTS

2009/0274847 A1* 11/2009 Guo et al. .................. 427/430.1

FOREIGN PATENT DOCUMENTS

| JP | 1-159212 U | 11/1989 |
| JP | 4-206032 A | 7/1992 |

(Continued)

OTHER PUBLICATIONS

JP 06111300 A, Machine Translation provided by J-PlatPat, originally published 1994, p. 1-7.*

(Continued)

*Primary Examiner* — Katherine A Bareford
*Assistant Examiner* — Christina McClure
(74) *Attorney, Agent, or Firm* — Sughrue Mion, PLLC

(57) ABSTRACT

The present invention provides a device and a method for producing a magnetic recording medium having a lubricant membrane with a uniform thickness on a surface. The device for producing the magnetic recording medium includes: a hanger device that is inserted into the central hole of the magnetic recording medium and supports the magnetic recording medium in a hanging state; and a raising and lowering device that raises and lowers one of the hanging device and an immersion tank with respect to the other thereof. The hanger device includes a support plate of which an upper end comes into contact with an inner circumference of the magnetic recording medium and a liquid-cutting plate which extends from a lower end of the support plate and is distant by a space along the inner circumference of the magnetic recording medium from the inner circumference of the magnetic recording medium.

6 Claims, 11 Drawing Sheets

X-X' cross-sectional view

(51) Int. Cl.
    *B05C 13/02* (2006.01)
    *B05C 3/02* (2006.01)

(56) References Cited

FOREIGN PATENT DOCUMENTS

| JP | 06111300 A | * | 4/1994 | ............... G11B 5/84 |
|----|------------|---|--------|---------------------------|
| JP | 06-150307 A |  | 5/1994 | |
| JP | 11138088 A | * | 5/1999 | ............... B05D 1/18 |
| JP | 2007-095208 A | | 4/2007 | |

| WO | 2009/031599 A1 | 3/2009 |
|----|----------------|--------|

OTHER PUBLICATIONS

JP 11138088 A, Machine Translation provided by J-PlatPat, originally published 1994, p. 1-5.*
Communication dated Jul. 3, 2014, issued by the Intellectual Property Office of P.R. China in counterpart Chinese application No. 201180006960.3.
International Search Report for PCT/JP2011/051182 issued Apr. 19, 2011.

* cited by examiner

X-X' cross-sectional view

Y-Y' cross-sectional view

*FIG. 5A* *FIG. 5B*
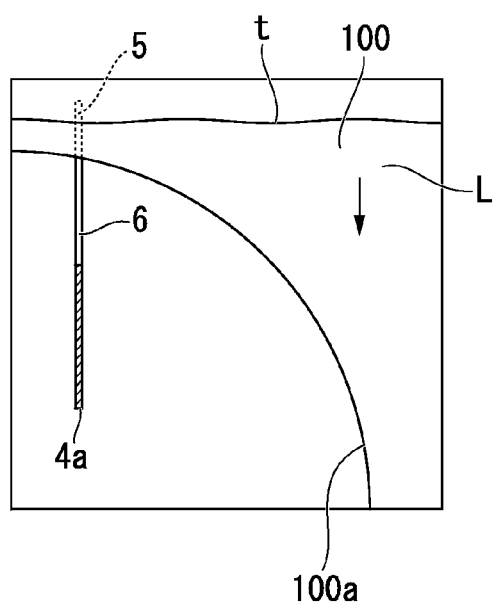
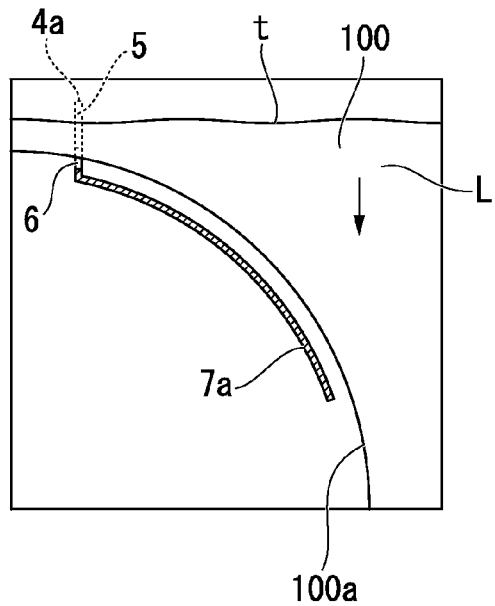

FIG. 7A
FIG. 7B
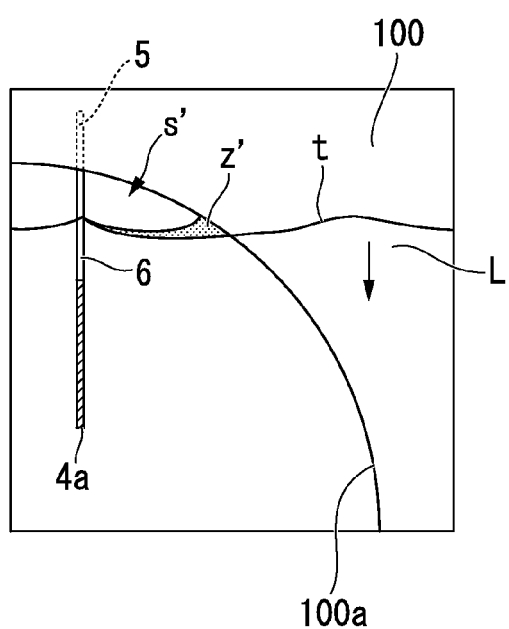
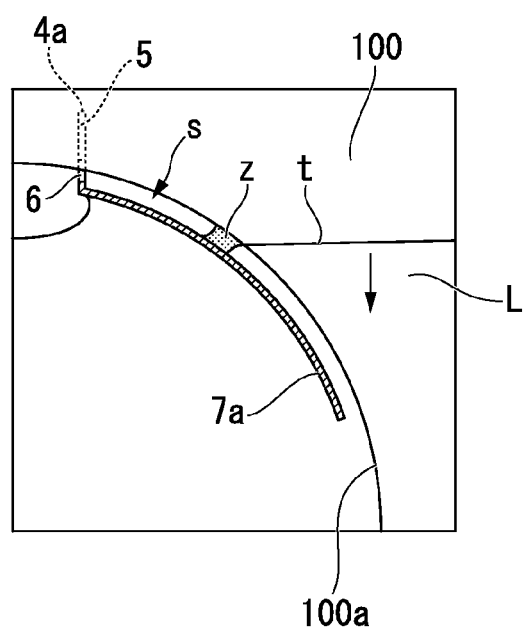

METHOD FOR PRODUCING AND DEVICE FOR PRODUCING MAGNETIC RECORDING MEDIUM

CROSS REFERENCE TO RELATED APPLICATIONS

This application is a National Stage of International Application No. PCT/JP2011/051182 filed Jan. 24, 2011, claiming priority based on Japanese Patent Application No. 2010-014272 filed Jan. 26, 2010, the contents of all of which are incorporated herein by reference in their entirety.

TECHNICAL FIELD

The present invention relates to a device for producing a magnetic recording medium and a method for producing a magnetic recording medium, the device and method capable of forming a lubricant membrane on the surface of the disk-shaped magnetic recording medium having a central hole by immersing the magnetic recording medium into an immersion tank that has a liquid lubricant, and then raising the magnetic recording medium from the immersion tank.

BACKGROUND ART

In recent years, improvement in recording density has been remarkable in the field of magnetic recording media used in hard disk drives (HDD). In recent years, the recording density has continuously increased at the astonishing rate of about 1.5 times per year. This improvement in the recording density is supported by a variety of technologies. One of the key technologies is a control technology of slide characteristics between a magnetic head and a magnetic recording medium.

For example, since a CSS (Contact, Start, and Stop) type, called a Winchester type, in which basic operations of contact sliding-floating-contact sliding are performed from start to stop of a magnetic head has become a main technology of hard disk drives, the contact sliding of the magnetic head on a magnetic recording medium cannot be avoided.

For this reason, resolving problems with tribology between a magnetic head and a magnetic recording medium has been the main technical issue up to the present. Thus, efforts to improve a protective film laminated on a magnetic film of a magnetic recording medium have continued, and abrasion resistance and slide resistance on the surface of the magnetic recording medium are the main areas of improvement in reliability of the magnetic recording medium.

Protective layers made of various materials in magnetic recording media have been suggested. However, carbon films have mainly been utilized from the overall viewpoint of film formation properties, durability, and the like. Further, the hardness, density, coefficient of kinetic friction, and the like of the carbon films are significantly reflected on the CSS characteristics or corrosion resistance of magnetic recording media. Therefore, the hardness, density, coefficient of kinetic friction, and the like of the carbon films are very important.

However, the durability of the magnetic recording media is not sufficiently ensured merely by forming the protective film. Therefore, a lubricant membrane is formed on the surface of the protective film. The main roles of the lubricant membrane are to prevent a protective film or the like of a magnetic recording medium from being in direct contact with the atmosphere in order to improve corrosion resistance, to prevent a magnetic head slider from coming into direct contact with the protective film when the magnetic head slider accidentally comes into contact with a data surface of the magnetic recording medium, and to considerably reduce the frictional force of the magnetic head slider that slides on the magnetic recording medium.

Here, the thickness of a lubricant membrane formed on the surface of a magnetic recording medium is precisely managed within a unit of sub-nm. Therefore, as a method of forming a lubricant membrane, a so-called dipping method of immersing a magnetic recording medium into an immersion tank that has a liquid lubricant and then raising the magnetic recording medium from the immersion tank so that a lubricant membrane with a uniform thickness is formed on the surface of the magnetic recording medium has been widely used in the past (for example, see Patent Literature 1). In this dipping method, batch processing is generally used in terms of mass production. Therefore, collective processing is performed by immersing a plurality of magnetic recording media arranged in parallel into an immersion tank.

[Patent Document 1] Patent Application Laid-Open Publication No. 6-150307

DISCLOSURE OF INVENTION

In the method of applying a lubricant membrane using the above-described dipping method, it is important to raise the magnetic recording media at constant speed without shaking of the liquid surface of a liquid lubricant, when the magnetic recording media are raised from the immersion tank. This is because a line-shaped application irregularity may occur in a thickness distribution of the lubricant membrane formed on the surface of the magnetic recording medium, when the liquid surface of the liquid lubricant is shaken.

Specifically, each magnetic recording medium immersed into the immersion tank is supported in a hanging state by a hanger inserted into the central hole of each magnetic recording medium. Therefore, the liquid surface of the liquid lubricant may be disturbed (shaken), when the hanger is raised from the immersion tank that has the liquid lubricant. In particular, a liquid droplet (accumulating liquid) attached to the hanger may splash or drip at the moment the hanger is raised from the liquid surface. Therefore, irregularities may easily occur in the thickness distribution of the lubricant membrane formed on the surface of each magnetic recording medium.

In the invention disclosed in Patent Literature 1 described above, in order to resolve such a problem, an edge with an acute angle is formed in an upper end portion of the hanger coming into contact with the inner circumference portion of the magnetic recording medium to prevent the occurrence of accumulating liquid. In this case, however, at the moment the liquid surface of the liquid lubricant is cut by the edge, a small amount of accumulating liquid occurring in the edge may splash and the liquid surface of the liquid lubricant may be disturbed. Therefore, irregularities may occur in the thickness distribution of the lubricant membrane formed on the surface of the magnetic recording medium.

The present invention is devised in light of the above-mentioned circumstances and an object thereof is to provide a device for producing a magnetic recording medium and a method for producing a magnetic recording medium, the device and method capable of forming a lubricant membrane with a uniform thickness on the surface of a magnetic recording medium.

In order to achieve the above object, the invention provides the following means.

(1) A device for producing a disk-shaped magnetic recording medium having a central hole forms a lubricant membrane on a surface of the magnetic recording medium by immersing the magnetic recording medium into an immersion tank that has a liquid lubricant and then raising the magnetic recording medium from the immersion tank. The device includes: a hanger device that is inserted into the central hole of the magnetic recording medium and supports the magnetic recording medium in a hanging state; and a raising and lowering device that raises and lowers one of the hanging device and the immersion tank with respect to the other thereof. The hanger device includes a support plate of which an upper end comes into contact with an inner circumference of the magnetic recording medium and a liquid-cutting plate which extends from a lower end of the support plate and is distant by a space along the inner circumference of the magnetic recording medium from the inner circumference of the magnetic recording medium.

(2) In the device for producing the magnetic recording medium described in (1), the hanger device may include a pair of support plates of which upper ends come into contact with the inner circumference of the magnetic recording medium and a pair of liquid-cutting plates which extend in opposite directions to one another from lower ends of the pair of support plates and is distant by a space along the inner circumference of the magnetic recording medium from the inner circumference of the magnetic recording medium.

(3) In the device for producing the magnetic recording medium described in (1) or (2), the liquid-cutting plate may be bent throughout from a midway portion to a lower end thereof in a direction in which the liquid-cutting plate is separated from the inner circumference of the magnetic recording medium.

(4) In the device for producing the magnetic recording medium described in any one of (1) to (3), a lower end of the liquid-cutting plate may be located below a position at which an accumulating liquid in the space between the liquid-cutting plate and the inner circumference of the magnetic recording medium is to be cut.

(5) In the device for producing the magnetic recording medium described in any one of (1) to (4), a groove portion engaging with the inner circumference of the magnetic recording medium may be formed in the upper end of the support plate.

(6) In the device for producing the magnetic recording medium described in (5), a slit notched in a vertical downward direction in the support plate may be formed in a bottom of the groove portion.

(7) In the device for producing the magnetic recording medium described in any one of (1) to (6), the hanger device may support a plurality of the magnetic recording media in a state of being arranged in a row.

(8) A method for producing a disk-shaped magnetic recording medium having a central hole includes forming a lubricant membrane on a surface of the magnetic recording medium by immersing the magnetic recording medium into an immersion tank that has a liquid lubricant, while inserting a hanger device into the central hole of the magnetic recording medium and supporting the magnetic recording medium in a hanging state, and then raising the magnetic recording medium from the immersion tank. The hanger device is configured to include a support plate of which an upper end comes into contact with an inner circumference of the magnetic recording medium and a liquid-cutting plate which extends from a lower end of the support plate and is distant by a space along the inner circumference of the magnetic recording medium from the inner circumference of the magnetic recording medium.

According to the invention, when the magnetic recording medium is raised from the immersion tank that has the liquid lubricant, the shaking of the liquid surface of the liquid lubricant occurring at the moment the liquid surface of the liquid lubricant is cut by the support plate can be suppressed as far as possible by providing the liquid-cutting plate that is formed along the inner circumference of the magnetic recording medium with the space formed therebetween along the inner circumference of the magnetic recording medium.

According to the invention, the lubricant membrane with the uniform thickness can be formed on the surface of the magnetic recording medium, while preventing the line-shaped application irregularity in the thickness distribution of the lubricant membrane formed on the surface of the magnetic recording medium. Accordingly, it is possible to produce the magnetic recording medium suitable for low floating of a magnetic head and having excellent abrasion resistance and environmental resistance.

BRIEF DESCRIPTION OF DRAWINGS

FIGS. 5A and 5B are a side view illustrating simulation results obtained by comparing the liquid surface states of liquid lubricants when a magnetic recording medium is raised from an immersion tank and illustrating a state before an accumulating liquid is formed.

FIGS. 7A and 7B are a side view illustrating simulation results obtained by comparing the liquid surface states of liquid lubricants when the magnetic recording medium is raised from the immersion tank and illustrating a state in which the accumulating liquid is cut.

DETAIL DESCRIPTION OF THE INVENTION

Figure 1:
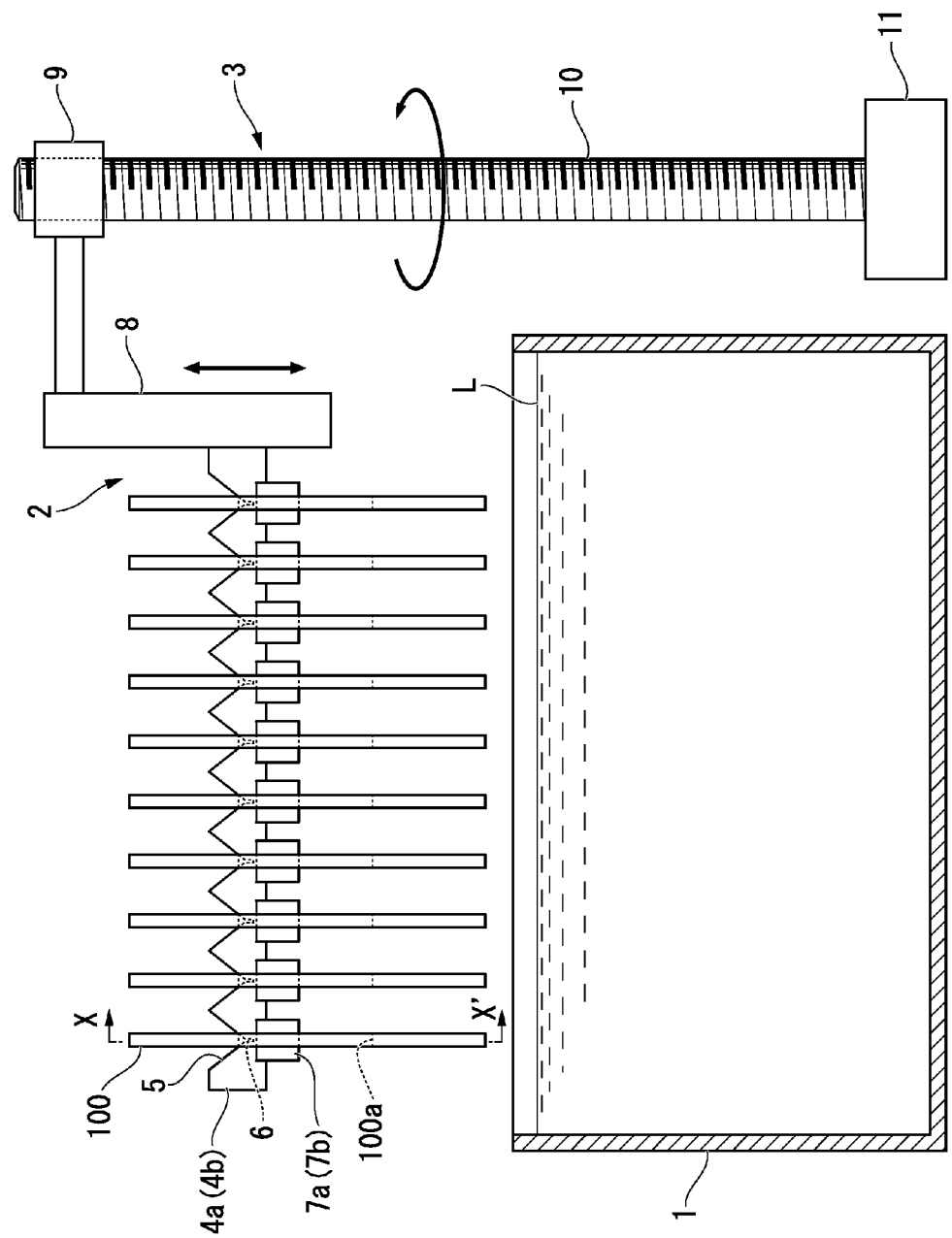
FIG. 1 is a side view illustrating an example of a dipping device according to the invention.
Figure 2:
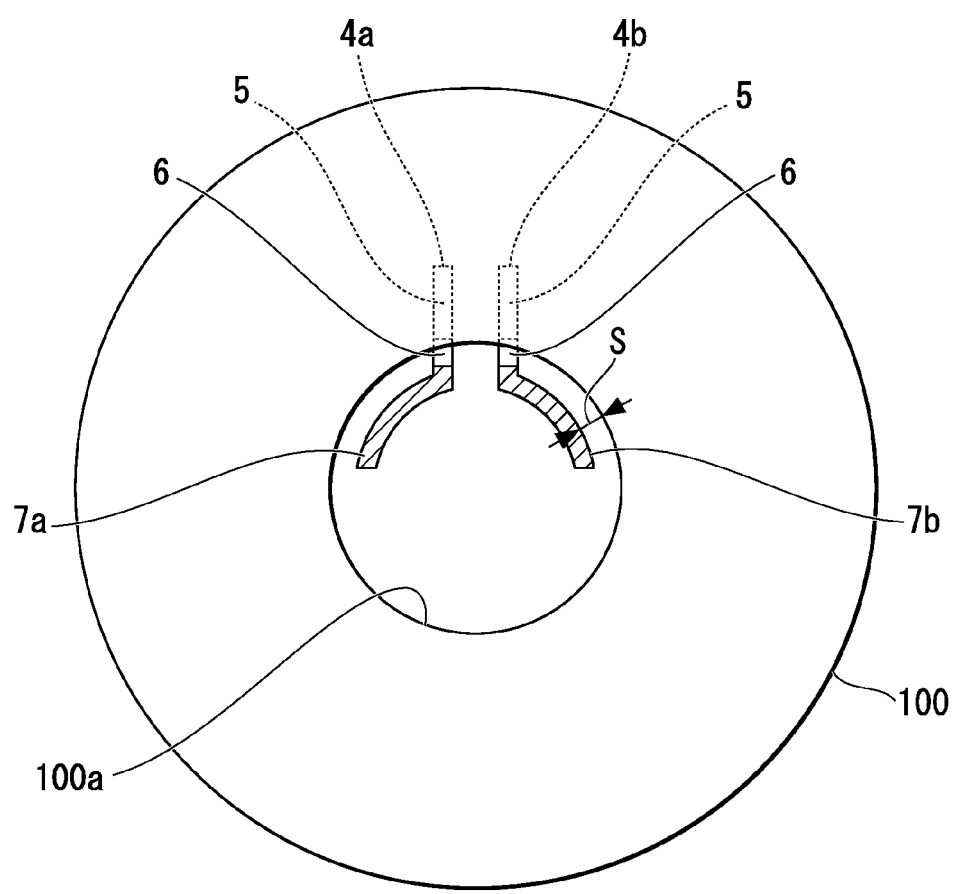
FIG. 2 is a sectional view illustrating a hanger device taken along the line X-X' shown in FIG. 1.
Figure 3:
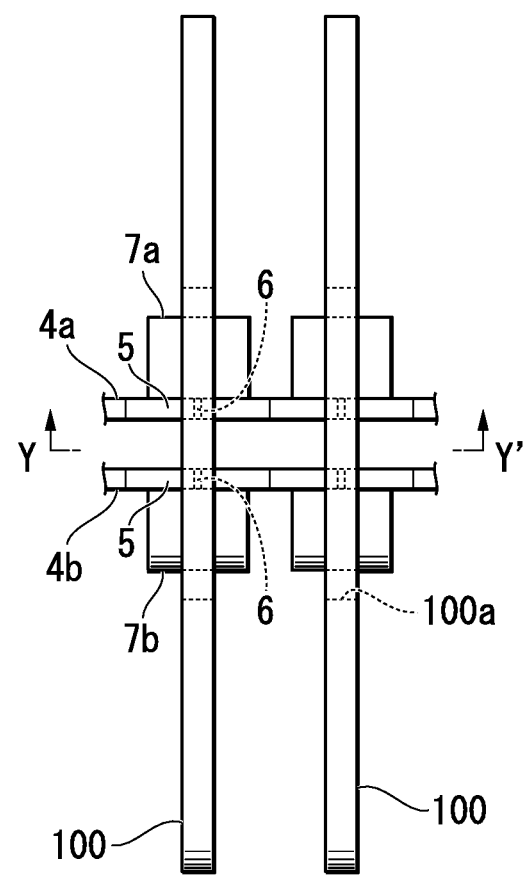
FIG. 3 is a plan view illustrating the main portions of the hanger device shown in FIG. 1, when viewed from the upper side.
Figure 4:
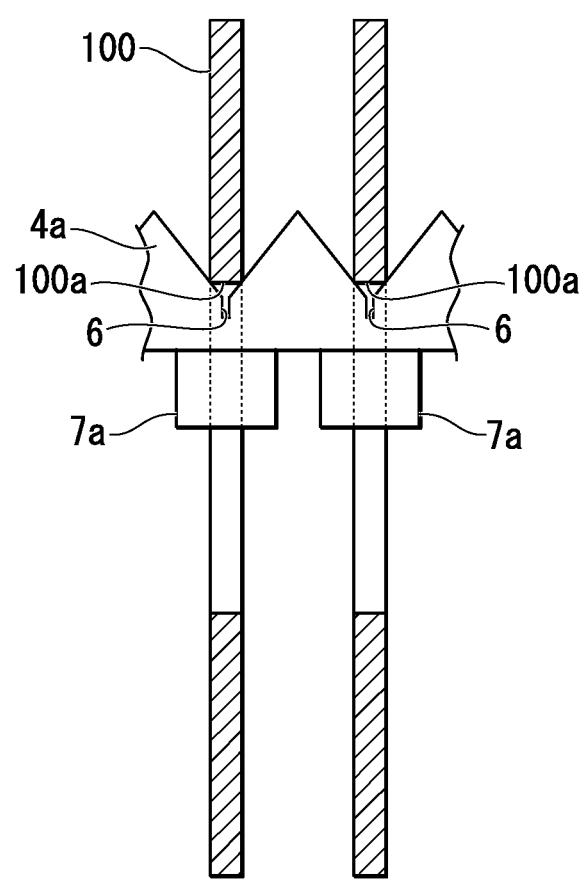
FIG. 4 is a sectional view illustrating the hanger device taken along the line Y-Y' shown in FIG. 3.

Hereinafter, an embodiment of the invention will be described in detail with reference to the drawings.
(Device for Producing Magnetic Recording Medium)
For example, as shown in FIG. 1, a device for producing a magnetic recording medium according to the invention is a so-called dipping device that forms a lubricant membrane on the surface of each disk-shaped magnetic recording medium 100 having a central hole 100a by immersing each magnetic recording medium 100 into an immersion tank 1 that has a liquid lubricant L and then raising each magnetic recording medium 100 from the immersion tank 1.

Specifically, as shown in FIGS. 1, 2, 3, and 4, the dipping device includes a hanger device 2 that is inserted into the central hole 100a of each magnetic recording medium 100 to support each magnetic recording medium 100 in a hanging state and a raising and lowering device 3 that raises and lowers one of the hanger device 2 and the immersion tank 1 with respect to the other thereof.

The hanger device 2 includes a pair of support plates 4a and 4b disposed to extend in parallel in a horizontal direction. In the upper ends of the pair of support plates 4a and 4b, a plurality of V-shaped groove portions 5 engaging with the inner circumferences of the magnetic recording media 100 are arranged at uniform intervals. Thus, the hanger device 2 supports the plurality of magnetic recording media 100 arranged in parallel in the length direction. By bringing the inner circumferences of the magnetic recording media 100 into contact with the grooves 5, the magnetic recording media 100 can be stably supported.

A slit 6 notched in the vertical downward direction in the pair of support plates 4a and 4b is formed in the bottom of the groove portion 5. The slit 6 is configured to guide the liquid lubricant L accumulated between the groove 5 and the inner circumference of the magnetic recording medium 100 engaging with this groove portion 5 swiftly downward. The slit 6 is notched in a straight line shape (or may be notched in a V shape) so as to have a width less than the thickness of the magnetic recording medium 100.

The hanger device 2 includes a pair of liquid-cutting plates 7a and 7b that extend in opposite directions from the lower ends of the pair of support plates 4a and 4b and is bent along the inner circumference of the magnetic recording medium 100. The pair of liquid-cutting plates 7a and 7b are curved in an arc shape so as to be distant by a uniform space S from the inner circumference of the magnetic recording medium 100. The lower ends of the pair of liquid-cutting plates 7a and 7b are located above the horizontal line passing through the center of the magnetic recording medium 100. The lower ends of the liquid-cutting plates 7a and 7b are preferably located below a position at which the accumulating liquid in the space S between the liquid-cutting plates 7a and 7b and the inner circumference of the magnetic recording medium 100 is to be cut, as described later.

The raising and lowering device 3 is not particularly limited, as long as the raising and lowering device 3 is a device that immerses the magnetic recording media 100 into the immersion tank 1 that has the liquid lubricant L and raises the magnetic recording media 100 from the immersion tank 1. For example, the raising and lowering device 3 includes a support pole 8 that supports the base ends of the pair of support plates 4a and 4b in a cantilever manner, a nut section 9 that is attached to the support pole 8, a lead screw 10 that meshes with the nut section 9, and a driving motor 11 that rotatably drives the lead screw 10. The pair of support plates 4a and 4b can be raised or lowered with respect to the immersion tank 1 by vertically moving the support pole 8 together with the nut section 9 meshing with the lead screw 10 while the driving motor 11 rotatably drives the lead screw 10.

In the dipping device having the above-described configuration, when each magnetic recording medium 100 immersed into the liquid lubricant L in the immersion tank 1 is raised from the immersion tank 1, the shaking of the liquid surface of the liquid lubricant L occurring at the moment the liquid surface of the liquid lubricant L is cut by the support plates 4a and 4b can be suppressed as far as possible by providing the liquid-cutting plates 7a and 7b that are distant by the space S along the inner circumference of the magnetic recording medium 100 from the inner circumference of the magnetic recording medium 100.

Specifically, FIGS. 5, 6, and 7 show the simulation results obtained by comparing the liquid surface states of the liquid lubricant L when the magnetic recording medium 100 is raised from the immersion tank 1 between the dipping device that includes the liquid-cutting plates 7a and 7b according to the invention and the dipping device that does not include the liquid-cutting plates 7a and 7b according to the related art.

Figure 6A:
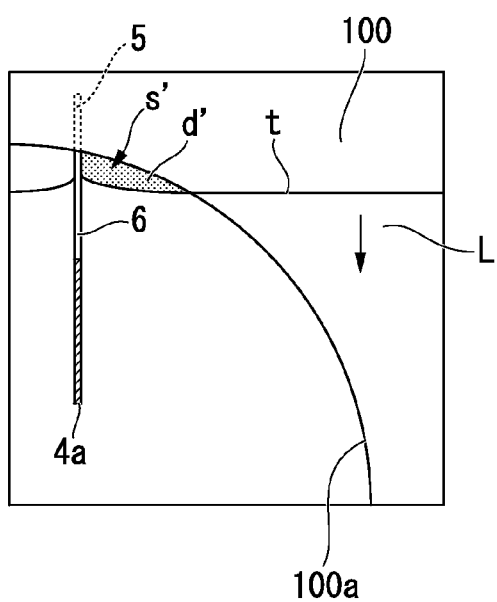
FIGS. 6A and 6B are a side view illustrating simulation results obtained by comparing the liquid surface states of liquid lubricants when the magnetic recording medium is raised from the immersion tank and illustrating a state in which the accumulating liquid is formed.
Figure 6B:
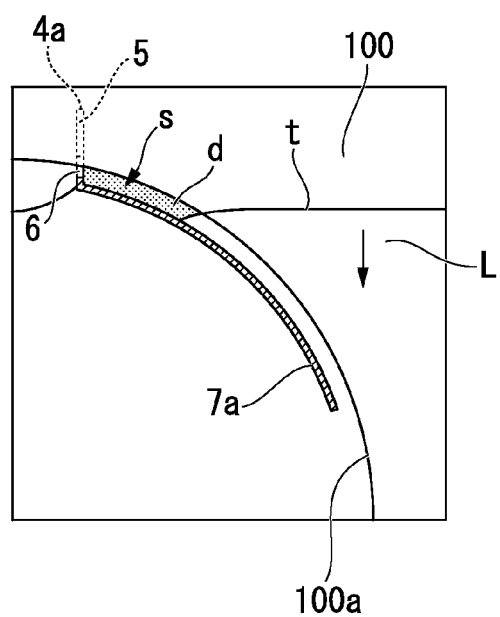

FIGS. 5A, 6A, and 7A show the simulation results in the dipping device according to the related art. FIGS. 5B, 6B, and 7B show the simulation results in the dipping device according to the invention. FIGS. 5A, 6A, and 7A and FIGS. 5B, 6B, and 7B are expanded views illustrating the vicinity of a position at which the inner circumference of the magnetic recording medium 100 comes into contact with the support plate 4a.

In the dipping device according to the related art, as shown in FIG. 5A, a liquid surface t of the liquid lubricant L moves downward along the surface of the magnetic recording medium 100, when the magnetic recording medium 100 immersed into the liquid lubricant L in the immersion tank 1 is raised from the immersion tank 1 at a constant speed.

As shown in FIG. 6A, when the position at which the upper end of the support plate 4a comes into contact with the inner circumference of the magnetic recording medium 100 is located above the liquid surface t of the liquid lubricant L, the liquid surface t of the liquid lubricant L separated by the upper end of the support plate 4a moves downward while forming an accumulating liquid d' in a space S' between the inner circumference of the magnetic recording medium 100 and the support plate 4a. The accumulating liquid d' is formed by the surface tension of the liquid lubricant L. The accumulating liquid d' is drawn toward the liquid surface t of the liquid lubricant L moving downward, and thus the thickness of the accumulating liquid d' is gradually thinned.

As shown in FIG. 7A, at the moment the accumulating liquid d' is cut, a remaining liquid z' forming the accumulating liquid d' is drawn toward the liquid surface t of the liquid lubricant L and moves up to the liquid surface t of the liquid lubricant L along the inner circumference of the magnetic recording medium 100. At this time, a wave motion caused by the movement of the remaining liquid z' in accordance with a drop difference between the remaining liquid z' and the liquid surface t is transmitted to the liquid surface t of the liquid lubricant L, and thus causes shaking (waving) of the liquid surface t of the liquid lubricant L.

Thus, in the dipping device according to the invention, as shown in FIG. 5B, a liquid surface t of the liquid lubricant L moves downward along the surface of the magnetic recording medium 100, when the magnetic recording medium 100 immersed into the liquid lubricant L in the immersion tank 1 is raised from the immersion tank 1 at a constant speed.

As shown in FIG. 6B, when the position at which the upper end of the support plate 4a comes into contact with the inner circumference of the magnetic recording medium 100 is located above the liquid surface t of the liquid lubricant L, the liquid surface t of the liquid lubricant L separated by the upper end of the support plate 4a moves downward while forming an accumulating liquid d in a space S between the inner circumference of the magnetic recording medium 100, and the support plate 4a and the liquid-cutting plate 7a. The accumulating liquid d is formed by the surface tension of the liquid lubricant L. The accumulating liquid d is drawn toward the liquid surface t of the liquid lubricant L moving downward, and thus the thickness of the accumulating liquid d is gradually thinned. Further, the amount of the accumulating liquid d can be controlled by the width of the space S. In general, the smaller the space S is, the smaller amount accumulating liquid d is, depending on the viscosity of the liquid lubricant L.

As shown in FIG. 7B, at the moment the accumulating liquid d is cut, a remaining liquid z forming the accumulating liquid d is drawn toward the liquid surface t of the liquid lubricant L and moves up to the liquid surface t of the liquid lubricant L along the space S between the inner circumference of the magnetic recording medium 100 and the liquid-cutting plate 7a. At this time, the wave motion caused by the movement of the remaining liquid z is suppressed by the liquid-cutting plate 7a. Therefore, the shaking (waving) of the liquid surface t occurring at the moment the liquid surface t of the liquid lubricant L is cut can be suppressed as far as possible.

Figure 8:
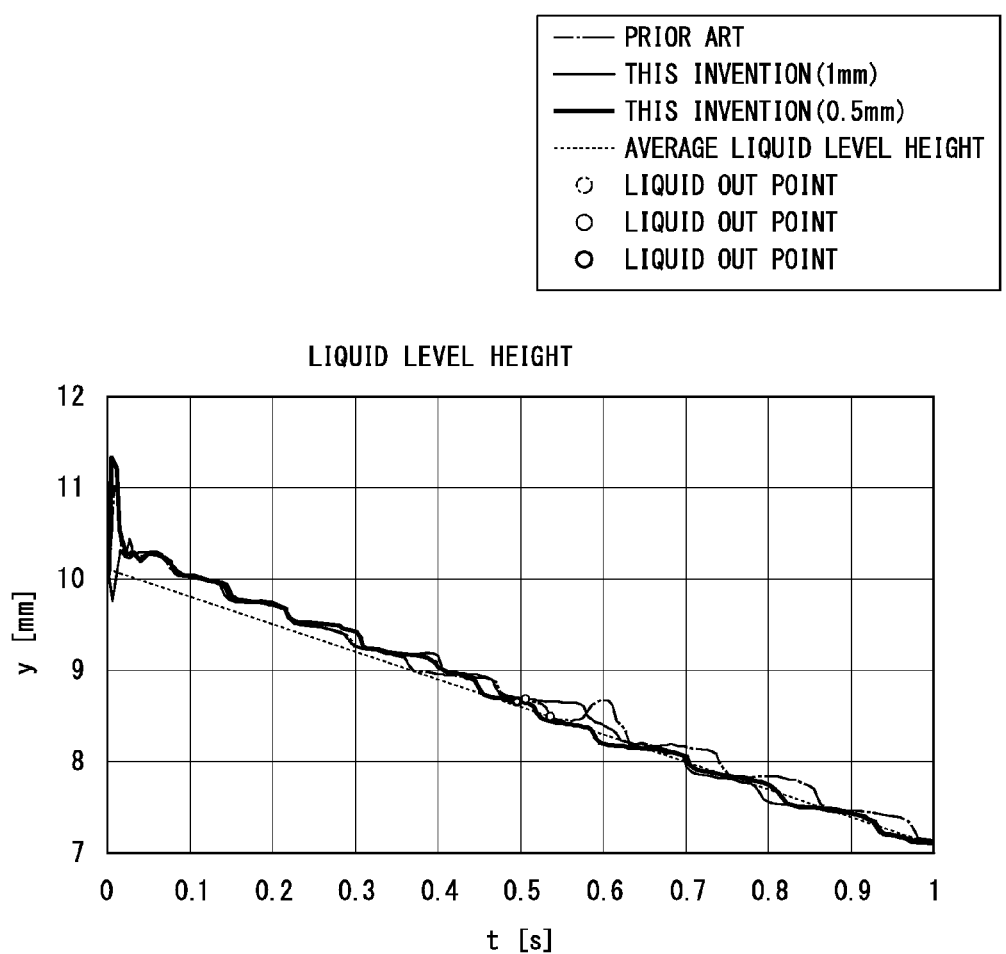
FIG. 8 is a diagram illustrating characteristics indicating the simulation of measuring the height of the liquid surface of a liquid lubricant when the magnetic recording medium is raised from the immersion tank.
Figure 9:
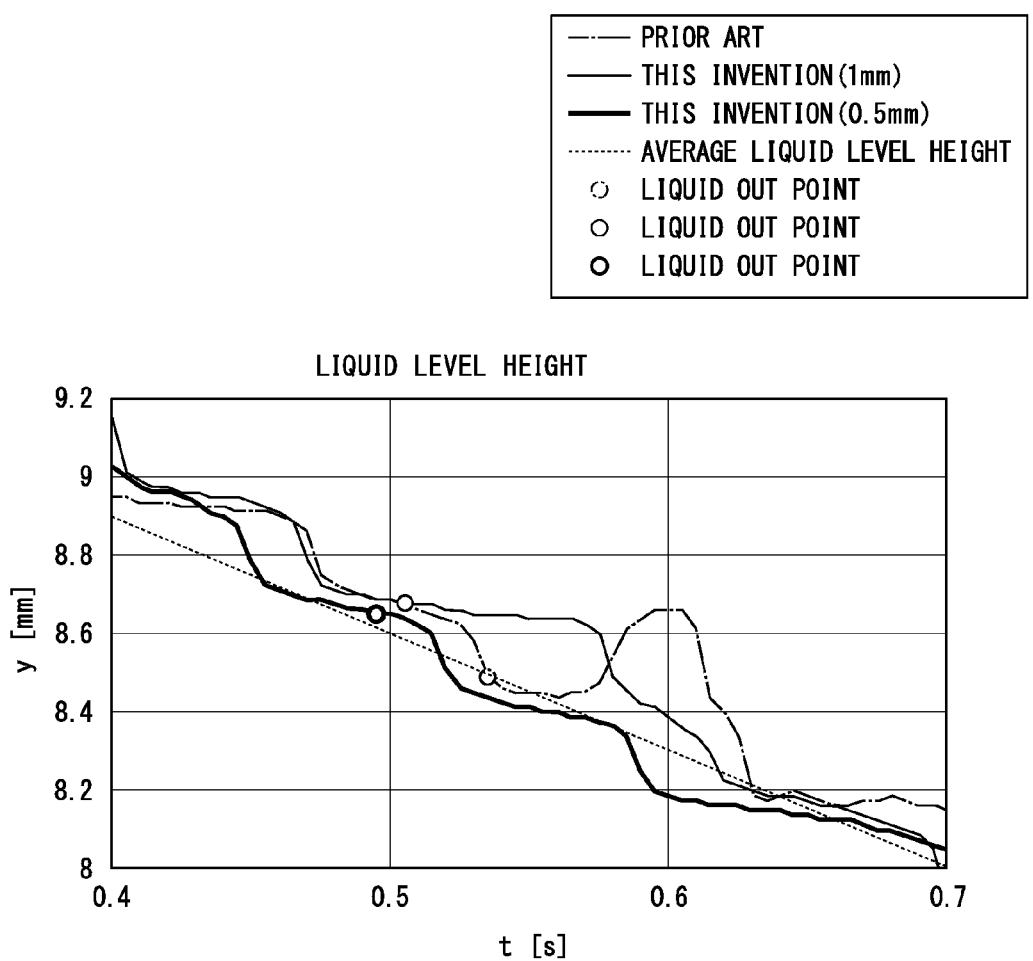
FIG. 9 is a characteristic diagram illustrating the vicinity of liquid out points of a graph shown in FIG. 7 in an expanded manner.

FIGS. 8 and 9 show the simulation results obtained by measuring the height of each liquid surface of the liquid lubricant L when the magnetic recording medium 100 is raised from the immersion tank 1 between the dipping device according to the invention and the dipping device according to the related art.

In this simulation of the dipping device according to the related art, an analysis model is used in which the magnetic recording media 100 with an outer diameter of 65 mm, an inner diameter of 20 mm, and a thickness of 0.8 mm are arranged in parallel to the support plate 4a (4b) with a thickness of 0.2 mm and a height of 7 mm at an interval of 6.35 mm, and the slit 6 with a width of 0.3 mm and a depth 3 mm is formed at the position at which the inner circumference of the magnetic recording medium 100 comes into contact with the support plate 4a (4b). In the dipping device according to the invention, on the other hand, the same analysis model as the analysis model of the dipping device according to the related art is used except that the space S between the inner circumference of the magnetic recording medium 100 and the liquid-cutting plate 7a (7b) is set to 0.5 mm and 1 mm. In the liquid lubricant, the coefficient of surface tension is set to $1/10$ of water and a contact angle is set to 60°. A case in which the liquid surface t descends at the speed of 3 mm/second is analyzed.

As a result, as shown in FIGS. 8 and 9, the dipping device according to the invention can suppress the shaking (waving) of the liquid surface t occurring at the moment the liquid surface t of the liquid lubricant L is cut, as low as possible, compared to the dipping device according to the related art. The graph shown in FIG. 9 shows the vicinity of the liquid out points of the graph shown in FIG. 8 in an expanded manner.

As described above, the dipping device according to the invention can form the lubricant membrane with the uniform thickness on the surface of the magnetic recording medium 100, while preventing application irregularity of a line shape in a thickness distribution of the lubricant membrane formed on the surface of the magnetic recording medium 100. Further, the magnetic recording medium suitable for low floating of a magnetic head and having excellent abrasion resistance and environmental resistance can be produced using this dipping device.

The invention is not limited to the above-described embodiment, but may be modified in various ways within the scope without departing from the gist of the invention.

Figure 10:
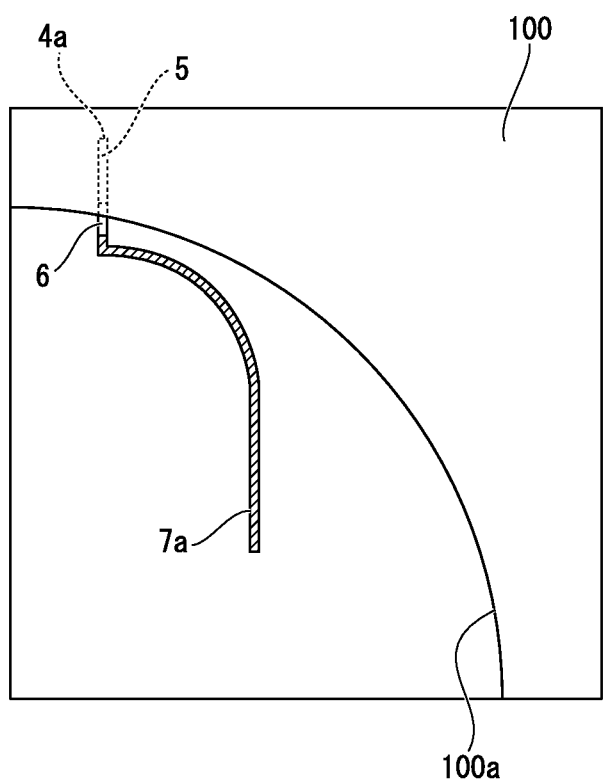
FIG. 10 is a side view illustrating a liquid-cutting plate according to a modification example.

For example, as shown in FIG. 10, the midway portion to the lower end of each of the liquid-cutting plates 7a and 7b may be bent in the direction in which the liquid-cutting plate is separated from the inner circumference of the magnetic recording medium 100. With such a configuration, the accumulating liquid d formed in the space S between the inner circumference of the magnetic recording medium 100 and the liquid-cutting plates 7a and 7b is drawn toward the liquid surface t of the liquid lubricant L moving downward. Then, the accumulating liquid d spreads in a transverse direction and a step difference between the accumulating liquid d and the liquid surface t is lessened when the thickness of the accumulating liquid d is gradually thinned. Therefore, it is possible to further suppress the shaking (waving) of the liquid surface t occurring at the moment the liquid surface t of the liquid lubricant L is cut, as far as possible.

(Magnetic Recording Medium)

Next, a specific configuration of a magnetic recording medium produced using the dipping device according to the invention will be described in detail exemplifying a discrete type magnetic recording medium 30 shown in FIG. 11.

In the description to be made below, the exemplified magnetic recording medium 30 is merely an example. The magnetic recording medium produced according to the invention is not limited to the configuration to be described, but may be appropriately modified within the scope without departing from the gist of the invention.

Figure 11:
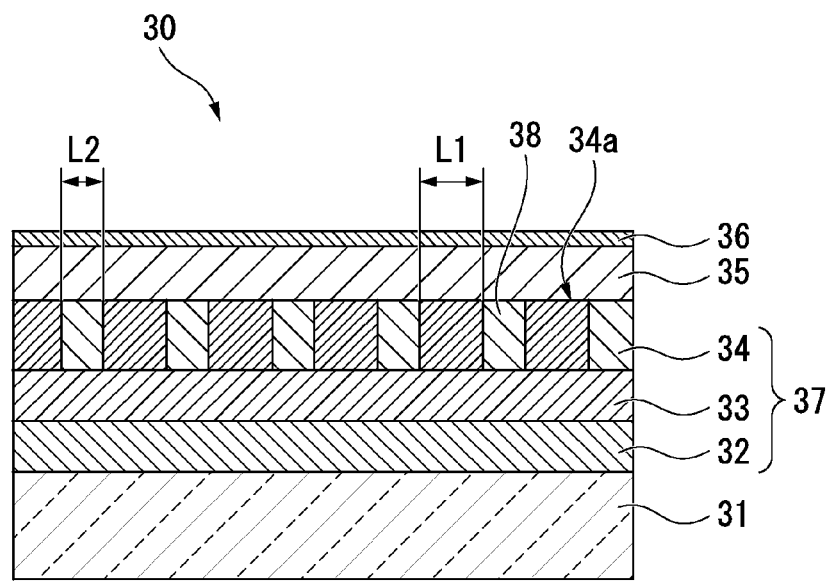
FIG. 11 is a sectional view illustrating an example of a magnetic recording medium.

As shown in FIG. 11, the magnetic recording medium 30 has a configuration in which a soft magnetic layer 32, an intermediate layer 33, a magnetic recording layer 34 having a magnetic recording pattern 34a, and a protective layer 35 are sequentially laminated on both surfaces of a non-magnetic substrate 31 and a lubricant membrane 36 is additionally formed on the outermost surface thereof. Further, a magnetic layer 37 is formed by the soft magnetic layer 32, the intermediate layer 33, and the magnetic recording layer 34. In FIG. 11, only one surface of the non-magnetic substrate 31 is illustrated.

Examples of the non-magnetic substrate 31 include an Al alloy, such as an Al—Mg alloy, having Al as a main component, a glass substrate such as a soda glass, an aluminosilicate-based glass, or a crystallized glass, or various substrates such as a silicon substrate, a titanium substrate, a ceramic substrate, and a resin substrate. Of these substrates, an Al alloy substrate, a glass substrate, or a silicon substrate is preferably used. Further, average surface roughness (Ra) of the non-magnetic substrate 31 is preferably 1 nm or less, is more preferably 0.5 nm or less, and is further more preferably 0.1 nm or less.

The soft magnetic layer 32 is formed in order to increase a vertical direction component of the magnetic flux occurring from a magnetic head with respect to the surface of the substrate and to fix the direction of the magnetization of the magnetic recording layer 34, in which information is recorded, more strongly in a direction perpendicular to the non-magnetic substrate 31. This operation is more remarkable particularly when a vertical recording single-magnetic pole head is used as a recording and reproducing magnetic head.

The soft magnetic layer 32 can be made of for example, a soft magnetic material containing Fe, Ni, Co, or the like. Specific examples of the soft magnetic material include CoFe-based alloys, (CoFeTaZr, CoFeZrNb, and the like), FeCo-based alloys (FeCo, FeCoV, and the like), FeNi-based alloys (FeNi, FeNiMo, FeNiCr, FeNiSi, and the like), FeAl-based alloys (FeAl, FeAlSi, FeAlSiCr, FeAlSiTiRu, FeAlO, and the like), FeCr-based alloys (FeCr, FeCrTi, FeCrCu, and the like), FeTa-based alloys (FeTa, FeTaC, FeTaN, and the like), FeMg-based alloys (FeMgO and the like), FeZr-based alloys (FeZrN and the like), FeZr-based alloys (FeZrN and the like), FeC-based alloys, FeN-based alloys, FeSi-based alloys, FeP-based alloys, FeNb-based alloys, FeHf-based alloys, and FeB-based alloys.

In the intermediate layer 33, the crystal grains of the magnetic layer can be made to be fine so that the recording and reproducing characteristics can be improved. The material of the intermediate layer is not particularly limited, but preferably has an hcp structure, an fcc structure, or an amorphous structure. In particular, Ru-based alloys, Ni-based alloys, Co-based alloys, Pt-based alloys, Cu-based alloys are preferable and these alloys may be multi-layered. For example, a multi-layered structure of an Ni-based alloy and a Ru-based alloy from a substrate side, a multi-layered structure of a Co-based alloy and a Ru-based alloy from the substrate side, or a multi-layered structure of a Pt-based alloy and a Ru-based alloy from the substrate side is preferably used.

For example, when a Ni-based alloy is used, the intermediate layer is preferably made of at least one kind of material selected from a NiW alloy, a NiTa alloy, a NiNb alloy, a NiTi alloy, a NiZr alloy, a NiMn alloy, and a NiFe alloy containing Ni in the range of 33 at % to 96 at %. Further, the intermediate layer may be made of a non-magnetic material containing at least one or two or more kinds of elements among Sc, Y, Ti, Zr Hf, Nb, Ta, and C in addition to Ni in the range of 33 at % to 96 at %. In this case, the effect of the intermediate layer 33 is maintained and the content of Ni is preferably in the range of 33 at % to 96 at % so as to satisfy the range in which no magnetization is given.

The preferable thickness of the intermediate layer 33 is a total of 5 nm to 40 nm and the more preferable thickness thereof is 8 nm to 30 nm, when the intermediate layer 33 is a multi-layered layer. When the thickness of the intermediate layer 33 is in this range, the vertical alignment property of a vertical magnetic layer is particularly increased. Further, the distance between the magnetic head and the soft magnetic layer can be decreased when information is recorded. Therefore, the recording and reproducing characteristics can be improved without reduction in the resolution of a reproduced signal.

The magnetic layer 37 may be a horizontal magnetic layer for an in-plane magnetic recording medium or a vertical magnetic layer for a vertical magnetic recording medium. However, the vertical magnetic layer is preferable in terms of realization of higher recording density. Further, the magnetic layer 37 is preferably made of an alloy containing Co as a main component. For example, a CoCrPt-based magnetic layer, a CoCrPtB-based magnetic layer, or a CoCrPtTa-based magnetic layer can be used or a magnetic layer having a granular structure to which an oxide such as $SiO_2$ or $Cr_2O_3$ is added can be used.

When the magnetic layer 37 is a vertical magnetic recording medium, the magnetic layer 37 can be used which has a lamination structure of the soft magnetic layer 32 made of a FeCo alloy (FeCoB, FeCoSiB, FeCoZr, FeCoZrB, FeCoZr-BCu, or the like), a FeTa alloy (FeTaN, FeTaC, or the like), a Co alloy (CoTaZr, CoZrNB, CoB, or the like), or the like, the intermediate layer 33 made of Ru or the like, and the magnetic recording layer 34 made of a 60Co-15Cr-15Pt alloy or a 70Co-5C-15Pt-10$SiO_2$ alloy. Further, an alignment control film made of Pt, Pd, NiCr, NiFeCr, or the like may be laminated between the soft magnetic layer 32 and the intermediate layer 33.

On the other hand, when the magnetic layer 37 is an in-plane magnetic recording medium, the magnetic layer 37 having a lamination structure of a non-magnetic CrMo underlying layer and a ferromagnetic CoCrPtTa magnetic layer can be used.

The thickness of the magnetic recording layer 34 is in the range of 3 nm to 20 nm, and is preferably in the range of 5 nm to 15 nm. The magnetic recording layer 34 may be formed so that sufficient output and input powers of the head are obtained in accordance with a kind of magnetic alloy and a lamination structure to be used. Further, the thickness of the magnetic layer 37 has to be ensured to some extent in order to obtain a given output or more at the reproduction time. In general, all of the parameters indicating the recording and reproducing characteristics deteriorate when the output increases. Therefore, it is necessary to set an optimum thickness. The magnetic layer 37 is generally formed as a thin film by a sputtering method.

The magnetic recording layer 34 having the granular structure preferably contains at least Co and Cr as magnetic grains and a grain boundary portion of the magnetic grains preferably contains at least one or two or more elements selected from a Si oxide, a Cr oxide, a Ti oxide, a W oxide, a Co oxide, a Ta oxide, and a Ru oxide. Specifically, a CoCrPt—Si oxide, a CoCrPt—Cr oxide, a CoCrPt—W oxide, a CoCrPt—Co oxide, a CoCrPt—Cr oxide-W oxide, a CoCrPt—Cr oxide-Ru oxide, a CoRuPt—Cr oxide-Si oxide, a CoCrPtRu—Cr oxide-Si oxide, and the like are exemplified.

The average grain diameter of the magnetic crystal particles having the granular structure is preferably in the range of 1 nm to 12 nm. The total amount of the oxides present in the magnetic layer is preferably in the range of 3 mole % to 15 mole %. As a magnetic layer having no granular structure, a layer that contains Co and Cr or is made of a magnetic alloy preferably containing Pt is exemplified.

The magnetic recording medium 30 is a so-called discrete type magnetic recording medium in which the magnetic recording pattern 34a formed in the magnetic recording layer 34 is magnetically separated by a region (for example, a non-magnetic region or a region at which a coercive force is reduced by about 80% with respect to the magnetic recording layer 34) 38 at which magnetic characteristics are modified.

In the discrete type magnetic recording medium 30, a width L1 of the magnetic recording pattern 34a is preferably set to 200 nm or less and a width L2 of the modified region 38 is preferably set to 100 nm or less in the magnetic recording layer 34 in order to increase the recording density. A track pitch P (=L1+L2) of the magnetic recording medium 30 is preferably set to 300 nm or less, and is preferably narrowed as far as possible to increase the recording density.

The protective layer 35 may be made of a generally used material of a magnetic recording medium. Examples of the material include carbonaceous materials such as carbon (C), hydrogenated carbon (HXC), carbon nitride (CN), amorphous carbon, and silicon carbide (SiC), $SiO_2$, $Zr_2O_3$, and TiN. Further, the protective layer 35 may be a layer in which two or more layers are laminated. When the thickness of the protective layer 35 is greater than 10 nm, the distance between the magnetic head and the magnetic layer 37 increases. Therefore, since the sufficient input and output characteristics may not be obtained, the thickness of the protective layer 35 is preferably less than 10 nm.

The lubricant membrane 36 can be formed by applying, for example, a fluorine-based lubricant such as perfluoropolyether, fluorinated alcohol, or fluorinated carboxylic acid, a carbon hydride-based lubricant, or a lubricant formed of a mixture thereof on the protective layer 35. Further, the thickness of the lubricant membrane 36 is generally in the range of about 1 nm to about 4 nm.

A lubricant that is chemically stable and has low friction and low adsorption is suitably used as an unrefined lubricant generating a lubricant. Specifically, fluorine resin lubricant such as a perfluoropolyether-based lubricant containing a compound that has a perfluoropolyether structure is preferably used.

A kind of perfluoropolyether-based lubricant, a lubricant combined of a circular triphosphazene-based lubricant and perfluoropolyether-based lubricant, or a lubricant combined of a perfluoropolyether compound having a phosphazene ring in a terminal group and a perfluoropolyether compound having a hydroxyl group in a terminal group may be used as the perfluoropolyether-based lubricant.

Examples of the lubricant containing a compound having a perfluoropolyether structure include Fombline Z-DOL (product name) and Fombline Z-TETRAOL (product name) produced by Solvay Solexis, Inc. An example of the circular triphosphazene-based lubricant includes X-1p (product name) produced by DowChemical Co., Ltd. An example of the perfluoropolyether compound having a phosphazene ring in a terminal group includes MORESCO PHOPHAROLA20H-2000 (product name) produced by Matsumura Oil Research Corp. (MORESCO).

Subsequently, the lubricant obtained in this way is solved in a solvent and an application liquid (liquid lubricant) with a density suitable for an application method is prepared. A fluorine-based solvent or the like as in a solvent diluting the above-described lubricant is used as the solvent to be used here.

Next, the application solvent obtained in this way is applied to the protective layer. A dipping method (dip application method) is used in an application step. The dip application method is a method of forming the lubricant membrane with a constant thickness on the surface of the protective layer of the non-magnetic substrate by putting an application solution into the immersion tank of a dip application device, immersing the non-magnetic substrate in which each layer is formed up to the protective layer into the immersion tank, and then raising the non-magnetic substrate from the immersion tank at a predetermined speed.

Magnetic Recording and Reproducing Apparatus

Next, a magnetic recording and reproducing apparatus (HDD) according to the invention will be described.

Figure 12:
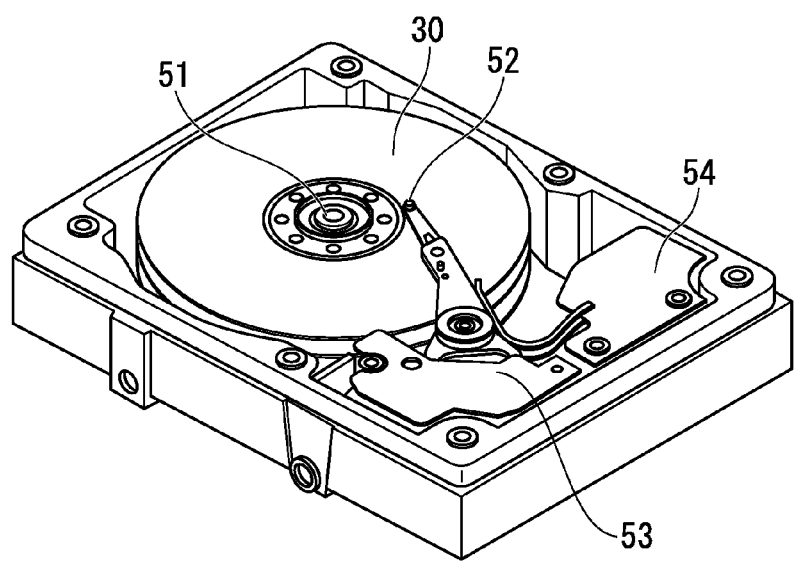
FIG. 12 is a perspective view illustrating an example of a magnetic recording and reproducing apparatus.

For example, as shown in FIG. 12, the magnetic recording and reproducing apparatus according to the invention includes the above-described magnetic recording medium 30, a rotation driving unit 51 that rotatably drives the magnetic recording medium 30, a magnetic head 52 that performs recording operation and reproducing operations on the magnetic recording medium 30, a head driving unit 53 that moves the magnetic head 52 in a radial direction of the magnetic recording medium 30, and a recording and reproducing signal processing system 54 that inputs a signal into the magnetic head 52 and reproduces a signal output from the magnetic head 52.

Since the magnetic recording and reproducing apparatus uses the above-described discrete type magnetic recording medium 30, writing blur in the magnetic recording on the magnetic recording medium 30 is eliminated and high surface recording density can be obtained. That is, since the above-described magnetic recording medium 30 is used, the magnetic recording and reproducing apparatus with a high recording density can be configured. Further, since the recording tracks of the magnetic recording medium 30 are processed discontinuously, the width of a reproducing head is configured to be narrower than the width of a recording head in order to eliminate the influence of the magnetization transition area of a track edge portion according to the related art. However, the width of the reproducing head can be configured to be almost the same as the width of the recording head for an operation. Thus, the sufficient reproduction output and a high SNR can be obtained.

When a reproducing head of the magnetic head 52 is configured by a GMR head or a TMR head, a sufficient signal intensity can be obtained even at a high recording density, and thus the magnetic recording and reproducing apparatus with a high recording density can be realized. Further, when the magnetic head 52 floats at a height lower than a magnetic head according to the related art within the range of 0.005 µm to 0.020 µm, an output can be improved and a high apparatus SNR can be obtained, and thus the magnetic recording and reproducing apparatus with a large capacity and high reliability can be provided.

When a signal processing circuit conforming to a maximum likelihood decoding method is combined, the recording density can be further improved. The sufficient SNR can be obtained even when recording and reproducing operations are performed at a track density of 100 k track/inch or more, a line recording density of 1000 k bit/inch or more, and a recording density of 100 G bits or more per square inch.

The invention is broadly applicable to magnetic recording media having magnetically separated magnetic recording patterns MP. Examples of the magnetic recording medium having the magnetic recording patterns include so-called patterned media in which magnetic recording patterns are arranged at every bit in accordance with given regularity, media in which magnetic recording patterns are arranged in a track state, and magnetic recording media which have a servo signal pattern. Of these media, the invention is preferably applied to so-called discrete type magnetic recording media in which the magnetically separated magnetic recording patterns are magnetic tracks and servo signal patterns in terms of manufacturing simplicity.

EXAMPLES

Hereinafter, the advantageous effects of the invention will be further apparent according to examples. The invention is not limited to the examples described below, but may be modified appropriately within the scope of the invention without departing from the gist of the invention.

Producing Magnetic Recording Medium

In the examples, a vacuum chamber in which an HD glass substrate was set was first exhausted to be in a vacuum state of $1.0 \times 10^{-5}$ Pa or less in advance. The glass substrate to be used here was made of a crystallized glass having $Li_2Si_2O_5$, $Al_2O_3$—$K_2O$, $Al_2O_3$—$K_2O$, $MgO$—$P_2O_5$, and $Sb_2O_3$—$ZnO$ as constituent components. The outer diameter was 65 mm, the inner diameter was 20 mm, the thickness was 0.8 mm, and the average surface roughness (Ra) was 2 angstroms.

Next, a FeCoB film with a thickness of 60 nm as the soft magnetic layer, a Ru film with a thickness of 10 nm as the intermediate layer, a 70Co-5Cr-15Pt-10SiO$_2$ alloy film with a thickness of a 15 nm or a 70Co-5Cr-15Pt alloy film with a thickness of 14 nm as the magnetic recording layer, and a CVD carbon film with a thickness of 5 nm as the protective layer were sequentially laminated on the glass substrate by a DC sputtering method.

Example 1

In Example 1, the lubricant was applied to the magnetic recording medium produced in the above-described way. Specifically, an application solution in which the lubricant was solved in a solvent was applied using a dipping device in accordance with a dipping method, and the lubricant membrane with 1.5 nm was formed on the surface of the protective layer of the magnetic recording medium.

The same dipping device as that shown in FIGS. 1 to 4 was used as the dipping device. Specifically, a pair of support plates with a thickness of 0.2 mm was provided in parallel with one another at an interval of 5 mm, the magnetic recording media were arranged in parallel at an interval of 6.35 mm in the V-shaped groove portions of the pair of support plates, and the slits with a width of 0.3 mm and a depth of 0.5 mm were provided at the positions at which the inner circumferences of the magnetic recording media came into contact with the support plates. Further, the liquid-cutting plates bent from the lower ends of the support plates along the inner circumferences of the magnetic recording media were provided with the space of 0.5 mm formed at the same interval between the inner circumferences of the magnetic recording media and the liquid-cutting plates. The length of each liquid-cutting plate was set to 10 mm.

Fombline Z-TETRAOL (product name) produced by Solvay Solexis, Inc. as the compound having a perfluoropolyether structure was used as the lubricant. Further, Vertrel XF (produce name) produced by Dupont-Mitsui Fluorochemicals Co., Ltd. was used as the solvent used to solve the lubricant. The concentration of the lubricant in the application solution was set to 0.3 mass %. The raising speed of the magnetic recording medium was set to 3 mm/second and the application thickness was set to 15 angstroms.

Comparative Example 1

In Comparative Example 1, the lubricant was applied to the magnetic recording medium, as in Example 1, except that the liquid-cutting plates were not provided in the dipping device.
Evaluation of Magnetic Recording Medium The thickness distributions of the lubricant membranes of the magnetic recording medium produced according to Example 1 and Comparative Example 1 were measured. The thickness distributions were measured using an optical surface inspection device, Candela 6100 (product name) made by KLA-Tencor Co., Ltd (US).

As a result, in the magnetic recording medium according to Comparative Example 1, a striped pattern caused due to the application irregularity of the lubricant membrane was observed in the straight line shape from the positions at which the inner circumference of the magnetic recording medium came into contact with the support plates. In the magnetic recording medium according to Example 1, however, the striped pattern caused due to the application irregularity of the lubricant membrane was not observed at all. Further, the variation in the thickness of the lubricant membrane caused due to the striped pattern observed in Comparative Example 1 was ±2 angstroms.

DENOTATION OF REFERENCE NUMERALS

1: immersion tank
2: hanger device
3: raising and lowering device
4a, 4b: support plate
5: groove portion
6: slit
7a, 7b: liquid-cutting plate
8: support pole
9: nut section
10: lead screw
11: driving motor
30: magnetic recording medium
31: non-magnetic layer
32: soft magnetic layer
33: intermediate layer
34: magnetic recording layer
34a: magnetic recording pattern
35: protective layer
36: lubricant membrane
37: magnetic layer
38: modified region
51: rotation driving unit
52: magnetic head
53: head driving unit
54: recording and reproducing signal processing system

The invention claimed is:
1. A method for producing a disk-shaped magnetic recording medium having a central hole, the method comprising:
 forming a lubricant membrane on a surface of the magnetic recording medium by immersing the magnetic recording medium into an immersion tank that has a liquid lubricant, while inserting a hanger device into the central hole of the magnetic recording medium and supporting the magnetic recording medium in a hanging state, and then raising the magnetic recording medium from the immersion tank,
 wherein the hanger device includes
 a pair of support plates of which upper ends come into contact with an inner circumference of the magnetic recording medium, and
 a pair of liquid-cutting plates which extend in opposite directions to one another from lower ends of the pair of support plates and which is distant by a space along the inner circumference of the magnetic recording medium from the inner circumference of the magnetic recording medium without contact with the inner circumference of the magnetic recording medium,
 wherein a groove portion engaging with the inner circumference of the magnetic recording medium is formed in the upper end of the support plate, and
 the pair of liquid-cutting plates is coplanar with the groove portion so as to be coplanar with the disk-shaped magnetic recording medium in a plane parallel to a data record surface of the magnetic recording medium, and the pair of liquid-cutting plates is placed at the inner circumference of the magnetic recording medium while raising the magnetic recording medium from the immersion tank.
2. The method for producing a disk-shaped magnetic recording medium having a central hole according to claim 1, wherein the liquid-cutting plate is bent throughout from a midway portion to a lower end thereof in a direction in which the liquid-cutting plate is separated from the inner circumference of the magnetic recording medium.
3. The method for producing a disk-shaped magnetic recording medium having a central hole according to claim 1, wherein a lower end of the liquid-cutting plate is located below a position at which an accumulating liquid in the space between the liquid-cutting plate and the inner circumference of the magnetic recording medium is to be cut.
4. The method for producing a disk-shaped magnetic recording medium having a central hole according to claim 1, wherein a slit notched in a vertical downward direction in the support plate is formed in a bottom of the groove portion.
5. The method for producing a disk-shaped magnetic recording medium having a central hole according to claim 1, wherein the hanger device supports a plurality of the magnetic recording media in a state of being arranged in a row.

6. The method for producing a disk-shaped magnetic recording medium having a central hole according to claim 1, wherein the space by which each of the pair of liquid-cutting plates is distant is uniform.

* * * * *